US009622225B2

(12) United States Patent
Seo et al.

(10) Patent No.: US 9,622,225 B2
(45) Date of Patent: Apr. 11, 2017

(54) METHOD AND DEVICE FOR TRANSMITTING AND RECEIVING SIGNAL BY TERMINAL IN WIRELESS COMMUNICATION SYSTEM TO WHICH CARRIER AGGREGATION TECHNIQUE IS APPLIED

(71) Applicant: LG ELECTRONICS INC., Seoul (KR)

(72) Inventors: Hanbyul Seo, Anyang-si (KR); Bonghoe Kim, Anyang-si (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 14/424,892

(22) PCT Filed: Aug. 28, 2013

(86) PCT No.: PCT/KR2013/007719
§ 371 (c)(1),
(2) Date: Feb. 27, 2015

(87) PCT Pub. No.: WO2014/035135
PCT Pub. Date: Mar. 6, 2014

(65) Prior Publication Data
US 2015/0223233 A1 Aug. 6, 2015

Related U.S. Application Data

(60) Provisional application No. 61/694,226, filed on Aug. 28, 2012.

(51) Int. Cl.
*H04W 4/00* (2009.01)
*H04W 72/04* (2009.01)
(Continued)

(52) U.S. Cl.
CPC ....... *H04W 72/0413* (2013.01); *H04L 5/0048* (2013.01); *H04W 36/04* (2013.01);
(Continued)

(58) Field of Classification Search
CPC ........... H04W 72/0413; H04W 72/042; H04W 74/0833; H04W 76/046; H04L 5/0048
(Continued)

(56) References Cited

U.S. PATENT DOCUMENTS 8,964,536 B2 * 2/2015 Sambhwani .......... H04W 36/22
370/230
8,976,748 B2 * 3/2015 Uemura ............ H04W 74/0833
370/329

(Continued)

FOREIGN PATENT DOCUMENTS

EP 2373090 A1 10/2011
EP 2375809 A1 10/2011
(Continued)

OTHER PUBLICATIONS

3GPP, "3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 . . . ," 3GPP TS 36.300 V11.1.0, Mar. 2012, pp. 1-194.

*Primary Examiner* — Farah Faroul
(74) *Attorney, Agent, or Firm* — Birch, Stewart, Kolasch & Birch, LLP

(57) ABSTRACT

The present application discloses a method of transmitting and receiving a signal by a terminal over a network in a wireless communication system. In particular, the method includes: receiving a downlink signal from the network through a downlink cell and transmitting an uplink signal to the network through a first uplink cell; receiving a specific
(Continued)

message for changing an uplink cell from the network; and changing an uplink cell to a second uplink cell according to the specific message and transmitting the uplink signal to the network through the second uplink cell, wherein when changing the uplink cell, the downlink cell is maintained.

12 Claims, 11 Drawing Sheets

(51) Int. Cl.
*H04W 36/04* (2009.01)
*H04W 36/08* (2009.01)
*H04L 5/00* (2006.01)
*H04W 74/08* (2009.01)
*H04W 76/04* (2009.01)
*H04W 16/32* (2009.01)

(52) U.S. Cl.
CPC ......... *H04W 36/08* (2013.01); *H04W 72/042* (2013.01); *H04W 74/0833* (2013.01); *H04W 76/046* (2013.01); *H04L 5/0098* (2013.01); *H04W 16/32* (2013.01)

(58) Field of Classification Search
USPC ........................................................ 370/329
See application file for complete search history.

(56) References Cited

U.S. PATENT DOCUMENTS

| | | |
|---|---|---|
| 2009/0215459 A1 | 8/2009 | Kuo |
| 2010/0234037 A1 | 9/2010 | Terry et al. |
| 2011/0032885 A1* | 2/2011 | Wang ................ H04W 72/0486 370/329 |
| 2012/0002643 A1 | 1/2012 | Chung et al. |
| 2012/0044812 A1 | 2/2012 | Hiddink et al. |
| 2012/0057544 A1* | 3/2012 | Xu ............................ H04L 1/00 370/329 |
| 2012/0163248 A1 | 6/2012 | Chin et al. |
| 2012/0218904 A1* | 8/2012 | Narasimha .............. H04L 5/001 370/248 |
| 2013/0010716 A1* | 1/2013 | Dinan ................. H04W 76/025 370/329 |
| 2013/0028223 A1* | 1/2013 | Kim ...................... H04L 5/0007 370/329 |
| 2013/0028239 A1* | 1/2013 | Dinan ............... H04W 72/0453 370/336 |
| 2013/0215848 A1 | 8/2013 | Kato et al. |
| 2014/0153536 A1* | 6/2014 | Ouchi ................. H04W 52/146 370/329 |
| 2016/0112946 A1* | 4/2016 | Yi ......................... H04W 48/20 370/280 |

FOREIGN PATENT DOCUMENTS

| | | |
|---|---|---|
| JP | 2009-201114 A | 9/2009 |
| JP | 2012-39400 A | 2/2012 |
| KR | 10-2011-0135404 A | 12/2011 |
| WO | WO 93/19537 A1 | 9/1993 |
| WO | WO 03/049480 A1 | 6/2003 |
| WO | WO 2010/105254 A2 | 9/2010 |
| WO | WO 2011/120853 A1 | 10/2011 |
| WO | WO 2012/095180 A1 | 7/2012 |

* cited by examiner

--Prior Art--

FIG. 2
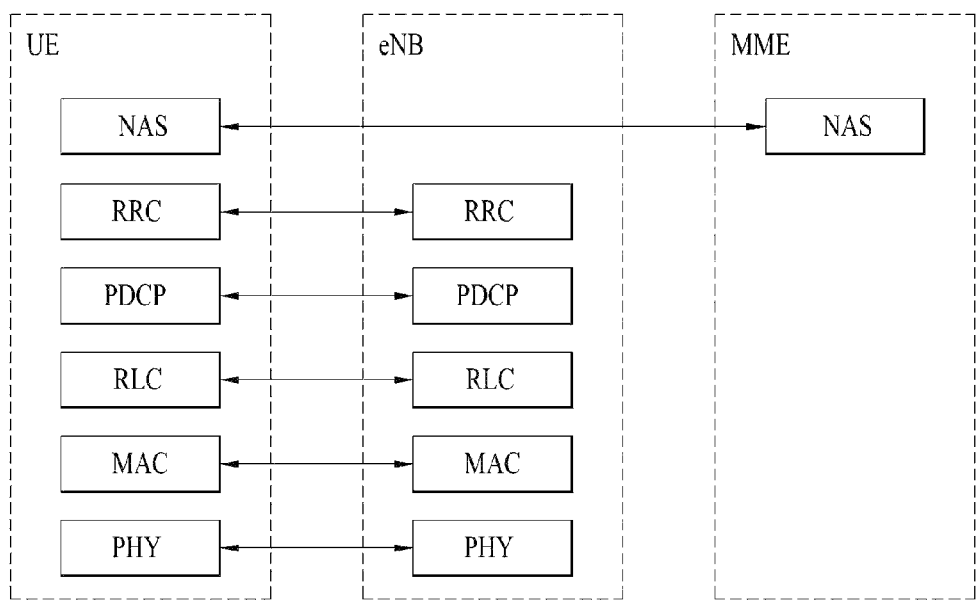
(a) CONTROL-PLANE PROTOCOL STACK
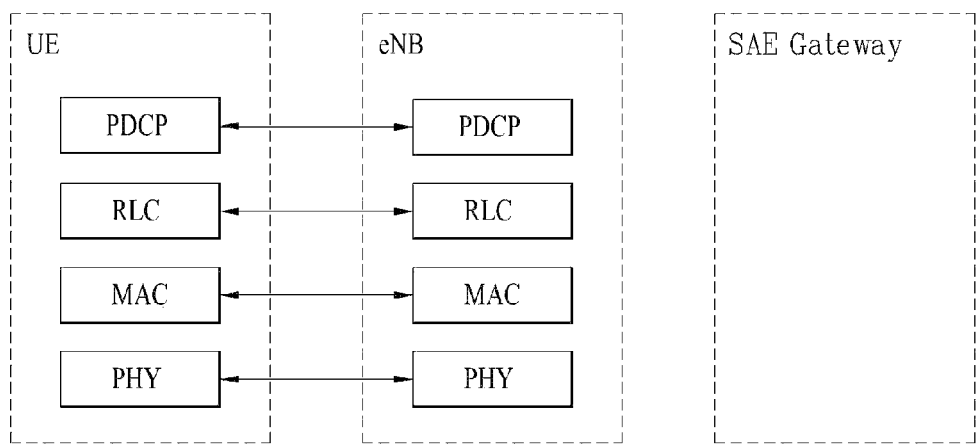
(b) USER-PLANE PROTOCOL STACK

FIG. 10

Component carrier activation message

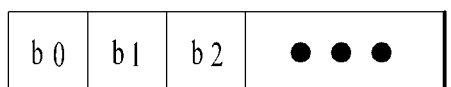

Assigned to pico eNB 5 : "1" means that pico eNB5 is activated in DL.

Assigned to macro eNB2 ( DL ) + pico eNB5 ( UL ) : "1" means that macro eNB2 and pico eNB5 are activated in DL and UL, respectively.

Assigned to macro eNB2 ( DL and UL ) : "1" means that macro eNB 2 is activated both in DL and UL, (a)

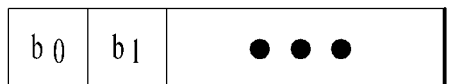

Macro eNB 2 is always activated in DL as PCell.

Assigned to pico eNB5 ( DL and UL ) : "1" means that pico eNB5 is activated both in DL and UL.

Assigned to pico eNB 5 ( DL ) + macro eNB 2 ( UL ) : "1" means that pico eNB 5 and macro eNB 2 are activated in DL and UL, respectively.

(b)

METHOD AND DEVICE FOR TRANSMITTING AND RECEIVING SIGNAL BY TERMINAL IN WIRELESS COMMUNICATION SYSTEM TO WHICH CARRIER AGGREGATION TECHNIQUE IS APPLIED

CROSS REFERENCE TO RELATED APPLICATIONS

This application is the National Phase of PCT International Application No. PCT/KR2013/007719, filed on Aug. 28, 2013, which claims priority under 35 U.S.C. 119(e) to U.S. Provisional Application No. 61/694,226, filed on Aug. 28, 2012, all of which are hereby expressly incorporated by reference into the present application.

TECHNICAL FIELD

The present invention relates to a wireless communication system and, more specifically, to a method and a device for transmitting and receiving a signal by a terminal in a wireless communication system to which carrier aggregation is applied.

BACKGROUND ART

A brief description will be given of a 3rd Generation Partnership Project Long Term Evolution (3GPP LTE) system as an example of a wireless communication system to which the present invention can be applied.

FIG. 1 illustrates a configuration of an Evolved Universal Mobile Telecommunications System (E-UMTS) network as an exemplary wireless communication system. The E-UMTS system is an evolution of the legacy UMTS system and the 3GPP is working on the basics of E-UMTS standardization. E-UMTS is also called an LTE system. For details of the technical specifications of UMTS and E-UMTS, refer to Release 7 and Release 8 of "3rd Generation Partnership Project; Technical Specification Group Radio Access Network", respectively.

Referring to FIG. 1, the E-UMTS system includes a User Equipment (UE), an evolved Node B (eNode B or eNB), and an Access Gateway (AG) which is located at an end of an Evolved UMTS Terrestrial Radio Access Network (E-UTRAN) and connected to an external network. The eNB may transmit multiple data streams simultaneously, for broadcast service, multicast service, and/or unicast service.

A single eNB manages one or more cells. A cell is set to operate in one of the bandwidths of 1.44, 3, 5, 10, 15 and 20 Mhz and provides Downlink (DL) or Uplink (UL) transmission service to a plurality of UEs in the bandwidth. Different cells may be configured so as to provide different bandwidths. An eNB controls data transmission and reception to and from a plurality of UEs. Regarding DL data, the eNB notifies a particular UE of a time-frequency area in which the DL data is supposed to be transmitted, a coding scheme, a data size, Hybrid Automatic Repeat reQuest (HARQ) information, etc. by transmitting DL scheduling information to the UE. Regarding UL data, the eNB notifies a particular UE of a time-frequency area in which the UE can transmit data, a coding scheme, a data size, HARQ information, etc. by transmitting UL scheduling information to the UE. An interface for transmitting user traffic or control traffic may be defined between eNBs. A Core Network (CN) may include an AG and a network node for user registration of UEs. The AG manages the mobility of UEs on a Tracking Area (TA) basis. A TA includes a plurality of cells.

While the development stage of wireless communication technology has reached LTE based on Wideband Code Division Multiple Access (WCDMA), the demands and expectation of users and service providers are increasing. Considering that other radio access technologies are under development, a new technological evolution is required to achieve future competitiveness. Specifically, cost reduction per bit, increased service availability, flexible use of frequency bands, a simplified structure, an open interface, appropriate power consumption of UEs, etc. are required.

DISCLOSURE

Technical Problem

An object of the present invention devised to solve the problem lies in a method and a device for transmitting and receiving a signal by a terminal in a wireless communication system to which carrier aggregation is applied.

Technical Solution

In an aspect of the present invention, a method for transmitting and receiving a signal by a terminal over a network in a wireless communication system, includes: receiving a downlink signal from the network through a downlink cell and transmitting an uplink signal to the network through a first uplink cell; receiving a specific message for changing an uplink cell from the network; and changing the uplink cell to a second uplink cell according to the specific message and transmitting the uplink signal to the network through the second uplink cell, wherein when changing the uplink cell, the downlink cell is maintained.

In another aspect of the present invention, a terminal in a wireless communication system includes: an RF communication module for receiving a downlink signal from a network through a downlink cell and transmitting an uplink signal to the network through a first uplink cell; and a processor for processing the downlink signal and the uplink signal, wherein the processor is configured to change an uplink cell to a second uplink cell according to a specific message when a specific message for changing the uplink cell is received from the network and to control the RF communication unit to transmit the uplink signal to the network through the second uplink cell, wherein, when changing the uplink cell, the downlink cell is maintained.

The specific message may be one of a handover command message, a radio resource control (RRC) connection reconfiguration message, a physical downlink control channel (PDCCH) order and a component carrier activation message and may include information about the second uplink cell.

Additionally, when the uplink cell is changed, transmission of a channel state report, transmission of a sounding reference signal and semi-persistent scheduling based transmission, performed through the first uplink cell, may be canceled.

The terminal may transmit a random access preamble to the network through the second uplink cell when the uplink cell is changed, wherein the random access preamble is pre-received through system information or an RRC layer message. Preambles for contention-based random access may be excluded from the random access preamble.

A random access procedure with the second uplink cell may be performed during an operation time of a timer when the uplink cell is changed, and the uplink cell may be re-changed to the first uplink cell when the random access procedure is not terminated before the timer expires.

Advantageous Effects

According to an embodiment of the present invention, a terminal can efficient transmit and receive a signal in a wireless communication system to which carrier aggregation is applied.

It will be appreciated by persons skilled in the art that that the effects that can be achieved through the present invention are not limited to what has been particularly described hereinabove and other advantages of the present invention will be more clearly understood from the following detailed description.

DESCRIPTION OF DRAWINGS

FIG. 2 is a diagram showing a control plane and a user plane of a radio interface protocol architecture between a User Equipment (UE) and an Evolved Universal Terrestrial Radio Access Network (E-UTRAN) based on a 3rd Generation Partnership Project (3GPP) radio access network standard.

FIG. 10 is a diagram showing structures of a component carrier activation message according to an embodiment of the present invention.

BEST MODE

Figure 1:
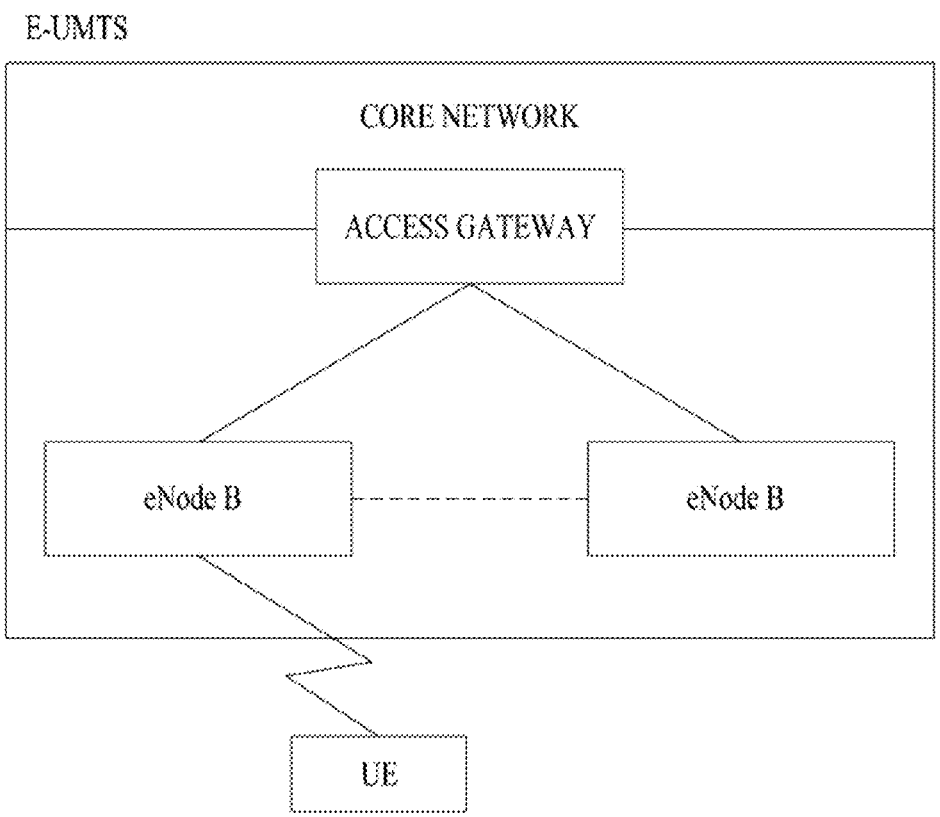
FIG. 1 is a diagram showing a network structure of an Evolved Universal Mobile Telecommunications System (E-UMTS) as an example of a wireless communication system.

The configuration, operation and other features of the present invention will be understood by the embodiments of the present invention described with reference to the accompanying drawings. The following embodiments are examples of applying the technical features of the present invention to a 3rd Generation. Partnership Project (3GPP) system.

Although, for convenience, the embodiments of the present invention are described using the LTE system and the LTE-A system in the present specification, the embodiments of the present invention are applicable to any communication system corresponding to the above definition.

FIG. 2 shows a control plane and a user plane of a radio interface protocol between a UE and an Evolved Universal Terrestrial Radio Access Network (E-UTRAN) based on a 3GPP radio access network standard. The control plane refers to a path used for transmitting control messages used for managing a call between the UE and the network. The user plane refers to a path used for transmitting data generated in an application layer, e.g., voice data or Internet packet data.

A physical (PHY) layer of a first layer provides an information transfer service to a higher layer using a physical channel. The PHY layer is connected to a Medium Access Control (MAC) layer located on a higher layer via a transport channel. Data is transported between the MAC layer and the PHY layer via the transport channel. Data is also transported between a physical layer of a transmitting side and a physical layer of a receiving side via a physical channel. The physical channel uses a time and a frequency as radio resources. More specifically, the physical channel is modulated using an Orthogonal Frequency Division Multiple Access (OFDMA) scheme in downlink and is modulated using a Single-Carrier Frequency Division Multiple Access (SC-FDMA) scheme in uplink.

A Medium Access Control (MAC) layer of a second layer provides a service to a Radio Link Control (RLC) layer of a higher layer via a logical channel. The RLC layer of the second layer supports reliable data transmission. The function of the RLC layer may be implemented by a functional block within the MAC. A Packet Data Convergence Protocol (PDCP) layer of the second layer performs a header compression function to reduce unnecessary control information for efficient transmission of an Internet Protocol (1P) packet such as an IPv4 packet or an IPv6 packet in a radio interface having a relatively small bandwidth.

A Radio Resource Control (RRC) layer located at the bottom of a third layer is defined only in the control plane and is responsible for control of logical, transport, and physical channels in association with configuration, re-configuration, and release of Radio Bearers (RBs). The RB is a service that the second layer provides for data communication between the UE and the network. To accomplish this, the RRC layer of the UE and the RRC layer of the network exchange RRC messages. The UE is in an RRC connected mode if an RRC connection has been established between the RRC layer of the radio network and the RRC layer of the UE. Otherwise, the UE is in an RRC idle mode. A Non-Access Stratum (NAS) layer located above the RRC layer performs functions such as session management and mobility management.

One cell of the eNB is set to use a bandwidth such as 1.25, 2.5, 5, 10, 15 or 20 MHz to provide a downlink or uplink transmission service to several UEs. Different cells may be set to provide different bandwidths.

Downlink transport channels for transmission of data from the network to the UE include a Broadcast Channel (BCH) for transmission of system information, a Paging Channel (PCH) for transmission of paging messages, and a downlink Shared Channel (SCH) for transmission of user traffic or control messages. Traffic or control messages of a downlink multicast or broadcast service may be transmitted through a downlink SCH and may also be transmitted through a downlink multicast channel (MCH). Uplink transport channels for transmission of data from the UE to the network include a Random Access Channel (RACH) for transmission of initial control messages and an uplink SCH for transmission of user traffic or control messages. Logical channels, which are located above the transport channels and are mapped to the transport channels, include a Broadcast Control Channel (BCCH), a Paging Control Channel (PCCH), a Common Control Channel (CCCH), a Multicast Control Channel (MCCH), and a Multicast Traffic Channel (MTCH).

Figure 3:
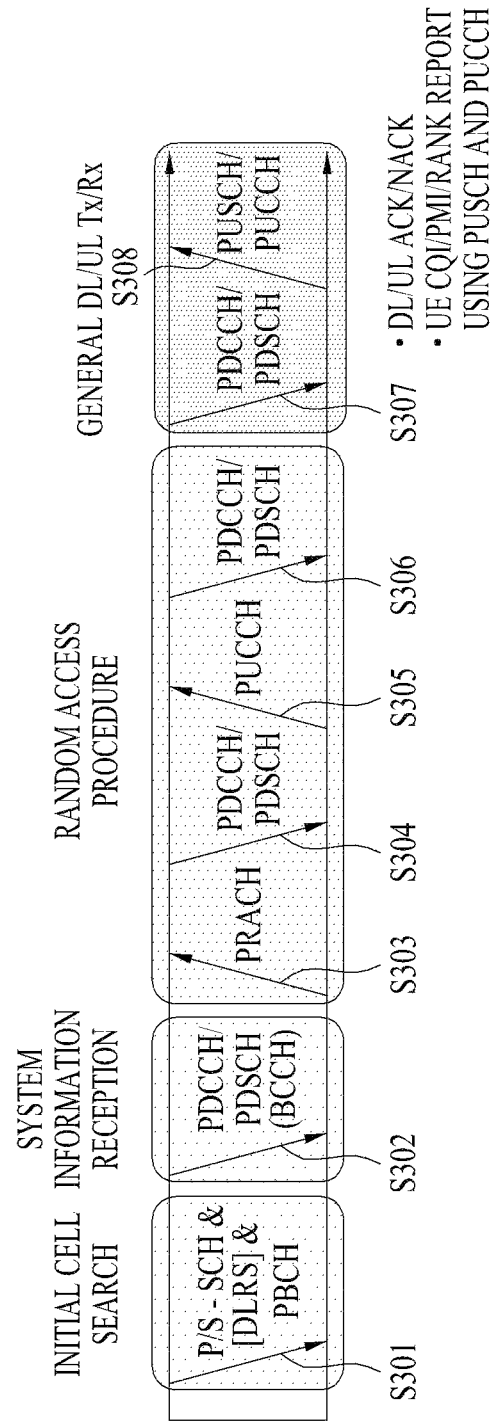
FIG. 3 is a diagram showing physical channels used in a 3GPP system and a general signal transmission method using the same.

FIG. 3 is a diagram showing physical channels used in a 3GPP system and a general signal transmission method using the same.

A UE performs an initial cell search operation such as synchronization with an eNB when power is turned on or the UE enters a new cell (S301). The UE may receive a Primary Synchronization Channel (P-SCH) and a Secondary Synchronization Channel (S-SCH) from the eNB, perform synchronization with the eNB, and acquire information such as a cell ID. Thereafter, the UE may receive a physical broadcast channel from the eNB so as to acquire broadcast information within the cell. Meanwhile, the UE may receive a Downlink Reference Signal (DL RS) so as to confirm a downlink channel state in the initial cell search step.

The UE, which has completed the initial cell search, may receive a Physical Downlink Control Channel (PDCCH) and a Physical Downlink Shared Channel (PDSCH) according to information included in the PDCCH so as to acquire more detailed system information (S302).

Meanwhile, if the eNB is initially accessed or radio resources for signal transmission are not present, the UE may perform a Random Access Procedure (RACH) (step S303 to S306) with respect to the eNB. In this case, the UE may transmit a specific sequence through a Physical Random Access Channel (PRACH) as a preamble (S303 and S305), and receive a response message of the preamble through the PDCCH and the PDSCH corresponding thereto (S404 and S306). In the case of contention-based RACH, a contention resolution procedure may be further performed.

The UE, which has performed the above procedures, may perform PDCCH/PDSCH reception (S307) and Physical Uplink Shared Channel PUSCH)/Physical Uplink Control Channel (PUCCH) transmission (S308) as a general uplink/downlink signal transmission procedure. In particular, the UE receives downlink control information (DCI) through a PDCCH. Here, the DCI includes control information such as resource allocation information of the UE and the format thereof differs according to the use purpose.

The control information transmitted from the UE to the eNB in uplink or transmitted from the eNB to the UE in downlink includes a downlink/uplink ACK/NACK signal, a Channel Quality Indicator (CQI), a Precoding Matrix Index (PMI), a Rank Indicator (RI), and the like. In the case of the 3GPP LTE system, the UE may transmit the control information such as CQI/PMI/RI through the PUSCH and/or the PUCCH.

Figure 4:
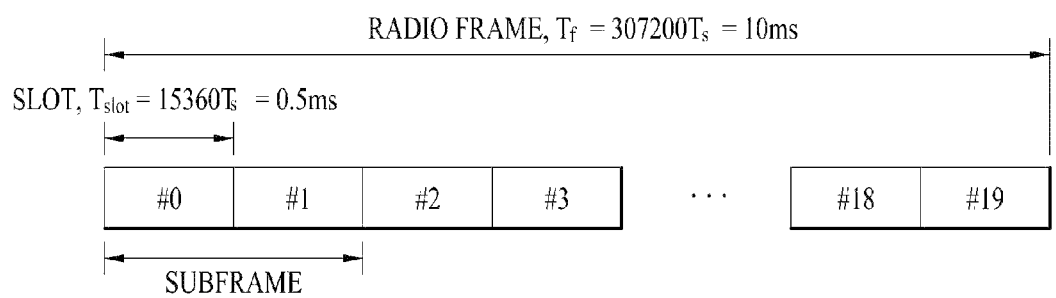
FIG. 4 is a diagram showing the structure of a radio frame used in a Long Term Evolution (LTE) system.

FIG. 4 is a diagram showing the structure of a radio frame used in a Long Term Evolution (LTE) system.

Referring to FIG. 4, the radio frame has a length of 10 ms ($327200 \times T_s$) and includes 10 subframes with the same size. Each of the subframes has a length of 1 ms and includes two slots. Each of the slots has a length of 0.5 ms ($15360 \times T_s$). $T_s$ denotes a sampling time, and is represented by $T_s=1/(15 \text{ kHz} \times 2048)=3.2552 \times 10^{-8}$ (about 33 ns). Each slot includes a plurality of OFDM symbols in a time domain, and includes a plurality of resource blocks (RBs) in a frequency domain. In the LTE system, one RB includes 12 subcarriers×7(6) OFDM or SC-FDMA symbols. A Transmission Time Interval (TTI) which is a unit time for transmission of data may be determined in units of one or more subframes. The structure of the radio frame is only exemplary and the number of subframes included in the radio frame, the number of slots included in the subframe, or the number of OFDM symbols included in the slot may be variously changed.

Figure 5:
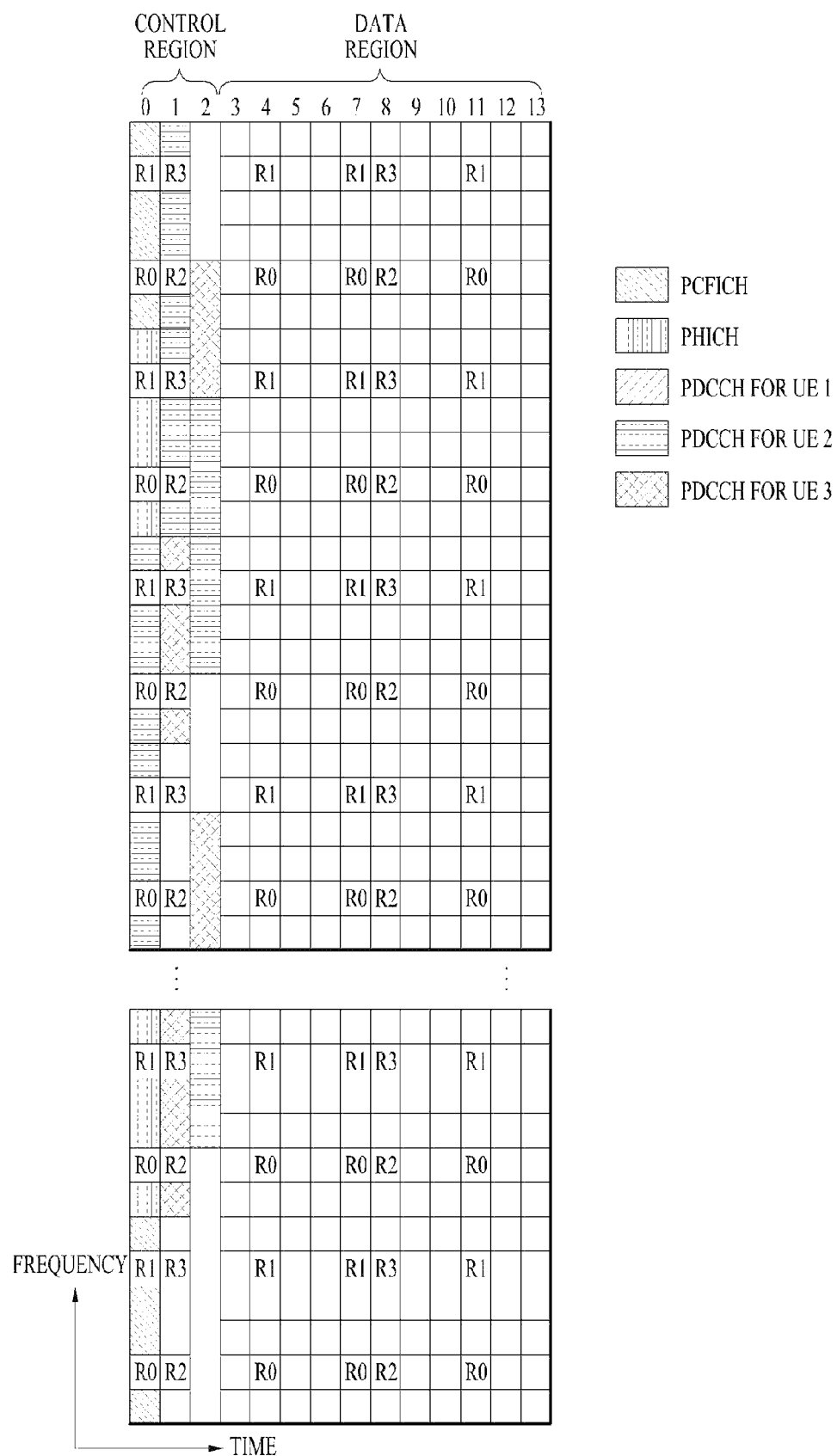
FIG. 5 is a diagram showing the structure of a downlink radio frame used in an LTE system.

FIG. 5 is a diagram showing a control channel included in a control region of one subframe in a downlink radio frame.

Referring to FIG. 5, a subframe includes 14 OFDM symbols. The first to third OFDM symbols are used as a control region and the remaining 13 to 11 OFDM symbols are used as a data region, according to subframe configuration. In FIG. 5, R1 to R4 denote reference signals (RS) or pilot signals for antennas 0 to 3. The RS is fixed to a constant pattern within a subframe regardless of the control region and the data region. A control channel is allocated to resources, to which the RS is not allocated, in the control region, and a traffic channel is also allocated to resources, to which the RS is not allocated, in the control region. Examples of the control channel allocated to the control region include a Physical Control Format Indicator Channel (PCFICH), a Physical Hybrid-ARQ Indicator Channel (PHICH), a Physical Downlink Control Channel (PDCCH), etc.

The Physical Control Format Indicator Channel (PCFICH) informs the UE of the number of OFDM symbols used for the PDCCH per subframe. The PCFICH is located at a first OFDM symbol and is configured prior to the PHICH and the PDCCH. The PCFICH includes four Resource Element Groups (REGs) and the REGs are dispersed in the control region based on a cell identity (ID). One REG includes four resource elements (REs). The PCFICH has a value of 1 to 3 or 2 to 4 according to bandwidth and is modulated using a Quadrature Phase Shift Keying (QPSK) scheme.

The Physical Hybrid-ARQ Indicator Channel (PHICH) is used to carry HARQ ACK/NACK for uplink transmission. That is, the PHICH refers to a channel via which DL ACK/NACK information for uplink HARQ is transmitted. The PHICH includes one REG and is scrambled on a cell-specific basis. ACK/NACK is indicated by one bit and is modulated using a binary phase shift keying (BPSK) scheme. The modulated ACK/NACK is repeatedly spread with a spreading factor (SF) of 2 or 4. A plurality of PHICHs mapped to the same resources configures a PHICH group. The number of PHICHs multiplexed in the PHICH group is determined according to the number of spreading codes. The PHICH (group) is repeated three times in order to obtain diversity gain in a frequency region and/or time region.

The Physical Downlink Control Channel (PDCCH) is allocated to the first n OFDM symbols of a subframe. Here, n is an integer of 1 or more and is indicated by a PCFICH. The PDCCH includes one or more Control Channel Elements (CCES). The PDCCH informs each UE or a UE group of information associated with resource allocation of a Paging Channel (PCH) and a Downlink-Shared Channel (DL-SCH), both of which are transport channels, uplink scheduling grant, HARQ information, etc. The paging channel (PCH) and the downlink-shared channel (DL-SCH) are transmitted through a PDSCH. Accordingly, the eNB and the UE transmit and receive data through the PDSCH except for specific control information or specific service data.

Information indicating to which UE (one or a plurality of UEs) data of the PDSCH is transmitted and information indicating how the UEs receive and decode the PDSCH data are transmitted in a state of being included in the PDCCH. For example, it is assumed that a specific PDCCH is CRC-masked with a Radio Network Temporary Identity (RNTI) "A", and information about data transmitted using radio resource (e.g., frequency location) "B" and transmission format information (e.g., transmission block size, modulation scheme, coding information, or the like) "C" is transmitted via a specific subframe. In this case, one or more UEs located within a cell monitor a PDCCH using its own RNTI information, and if one or more UEs having "A" RNTI are present, the UEs receive the PDCCH and receive the PDSCH indicated by "B" and "C" through the information about the received PDCCH.

Figure 6:
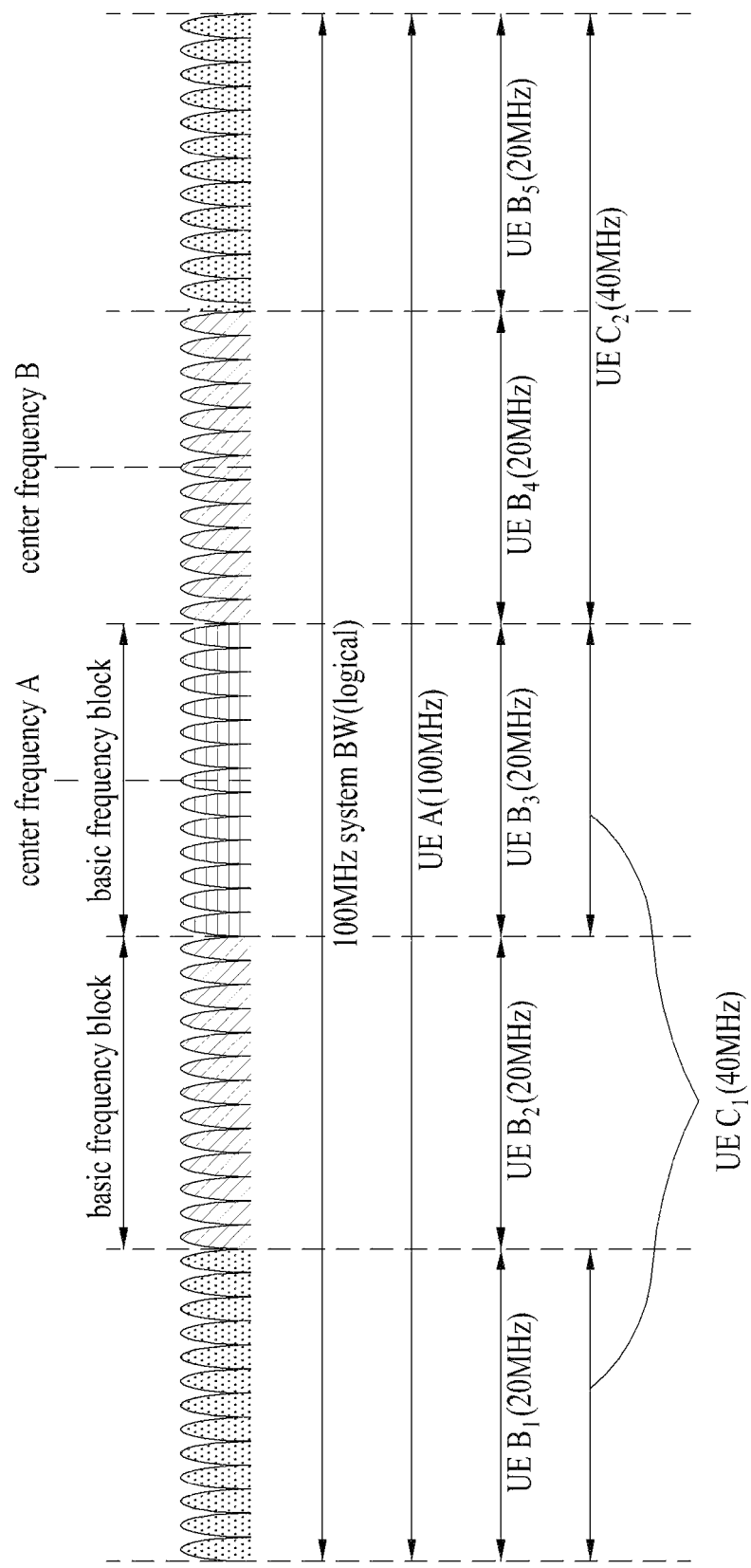
FIG. 6 is a conceptual diagram for explaining a carrier aggregation scheme.

In the following description, a carrier aggregation scheme is explained. FIG. 6 is a conceptual diagram for explaining a carrier aggregation scheme.

A carrier aggregation means a technology using one big logical frequency band in a manner that a user equipment uses a frequency block configured with an uplink resource (or a component carrier) and/or a downlink resource (or a component carrier) or a plurality of cells (of logical meaning) in order for a wireless communication system to use a wider frequency band. For clarity, a terminology of 'component carrier' is consistently used in the following description.

Referring to FIG. 6, a total system bandwidth (system BW) may have a system bandwidth up to maximum 100 MHz as a logical bandwidth. The total system bandwidth includes five component carriers and each of the component carriers may have up to maximum 20 MHz. The component carrier includes at least one physically contiguous subcarrier. Although each of the component carriers in FIG. 6 is depicted as including an identical bandwidth, this is exemplary only. Each of the component carriers may be able to have a bandwidth different from each other. And, although each of the component carriers is depicted as it is adjacent to each other in frequency domain, since the diagram is depicted in terms of a logical concept, each of the component carriers may be physically adjacent to each other or may be apart from each other.

A center frequency can be differently used for each of the component carriers or a common center frequency can be used for the component carriers physically adjacent to each other. As an example, in FIG. 6, if assumed that all component carriers are physically adjacent to each other, a center frequency 'A' can be used. Or, if assumed that each of the component carriers is not physically adjacent to each other, such a separate center frequency as a center frequency 'A', a center frequency 'B' or the like can be used for each of the component carriers.

In the present specification, a component carrier may correspond to a system bandwidth of a legacy system. By defining the component carrier on the basis of the legacy system, it may become easy to provide backward compatibility and to design a system in a radio communication environment in which an evolved UE and a legacy UE coexist. As an example, in case that LTE-A system supports a carrier aggregation, each of the component carriers may correspond to a system bandwidth of LTE system. In this case, the component carrier may have a prescribed bandwidth among the bandwidths of 1.25 MHz, 2.5 MHz, 5 MHz, 10 MHz, or 20 MHz.

In case that a total system bandwidth is expanded by a carrier aggregation, a frequency band used for communicating with each UE is defined by a component carrier unit. A UE A may use 100 MHz corresponding to the total system bandwidth and performs a communication in a manner of using all of the five component carriers. A UE $B_1$-$B_5$ can use a bandwidth of 20 MHz only and performs a communication by using one component carrier. A UE $C_1$ and a UE $C_2$ can use a bandwidth of 40 MHz and performs a communication by using two component carriers, respectively. The two component carriers may or may not be logically/physically adjacent to each other. The UE $C_1$ indicates a case that the UE $C_1$ uses two component carriers not adjacent to each other and the UE $C_2$ indicates a case that the UE $C_2$ uses two component carriers adjacent to each other.

LTE systems use one DL component carrier and one UL component carrier. On the other hand, LTE-A systems may use a plurality of component carriers as depicted in FIG. 6. A downlink component carrier or a combination of the DL component carrier and a UL component carrier corresponding to the DL component carrier can be referred to as a cell, and the corresponding relationship between the DL component carrier and the UL component carrier can be indicated through system information.

In this case, a scheme of scheduling a data channel, which is scheduled by a control channel, can be divided into a conventional linked carrier scheduling scheme and a cross carrier scheduling scheme More specifically, in the case of the linked carrier scheduling scheme, similar to a legacy LTE system using a single component carrier, a control channel transmitted on a specific component carrier schedules a data channel only via the specific component carrier. That is, a DL grant/UL grant transmitted in a PDCCH region of a DL component carrier of a specific component carrier (or specific cell) can schedule only a PDSCH/PUSCH of a cell to which the DL component carrier belongs. That is, a search space, which is a region in which detection of a DL grant/UL grant is attempted, is present in a PDCCH region of a cell including a PDSCH/PUSCH to be scheduled.

Meanwhile, in the case of cross carrier scheduling scheme, a control channel transmitted on a primary component carrier (primary CC) schedules a data channel transmitted on the primary component carrier or a different component carrier using a carrier indicator field (hereinafter abbreviated CIF). In other words, a monitored cell (or monitored CC) of cross carrier scheduling is configured and a DL grant/UL grant transmitted in a PDCCH region of the monitored cell schedules a PDSCH/PUSCH of the cell, which is configured to be scheduled in the corresponding cell. That is, a search space for a plurality of component carriers is present in the PDCCH region of the monitored cell. The PCell is set according to transmission of system information, attempt of initial access and transmission of uplink control information, from among the plurality of cells. The PCell is composed of a primary DL component carrier and a primary UL component carrier corresponding to the primary DL component carrier.

Figure 7:
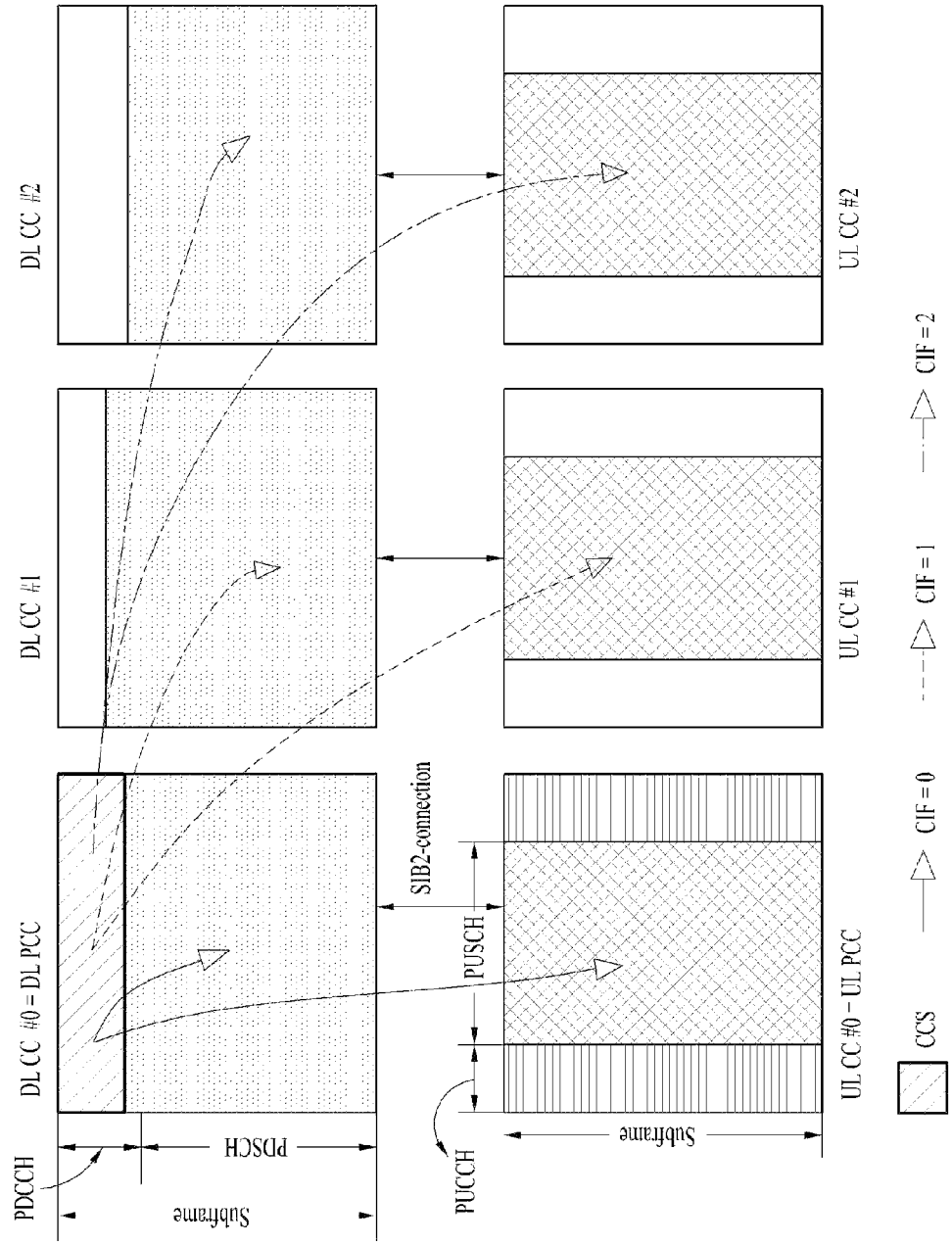
FIG. 7 is a diagram of an example to which a cross carrier scheduling scheme is applicable.

FIG. 7 is a diagram of an example to which a cross carrier scheduling scheme is applicable. In particular, the number of cells (or, component carriers) assigned to a relay node corresponds to 3 in FIG. 7. As mentioned in the foregoing description, cross carrier scheduling is performed using a CIF. In this case, assume that a DL cell (or, a component carrier) #A is a primary DL component carrier (i.e., a primary cell (PCell)) and assume that a component carrier #B and a component carrier #C are secondary component carriers (i.e., secondary cell (SCell)).

The present invention provides a method for effectively managing uplink resources for a primary component carrier (or primary cell or PCell) or a secondary component carrier (or secondary cell or SCell) during carrier aggregation operation of a UE. While the UE aggregates two component carriers in the following description, it is apparent that the present invention is applicable to a case in which the UE aggregates three or more component carriers.

Figure 8:
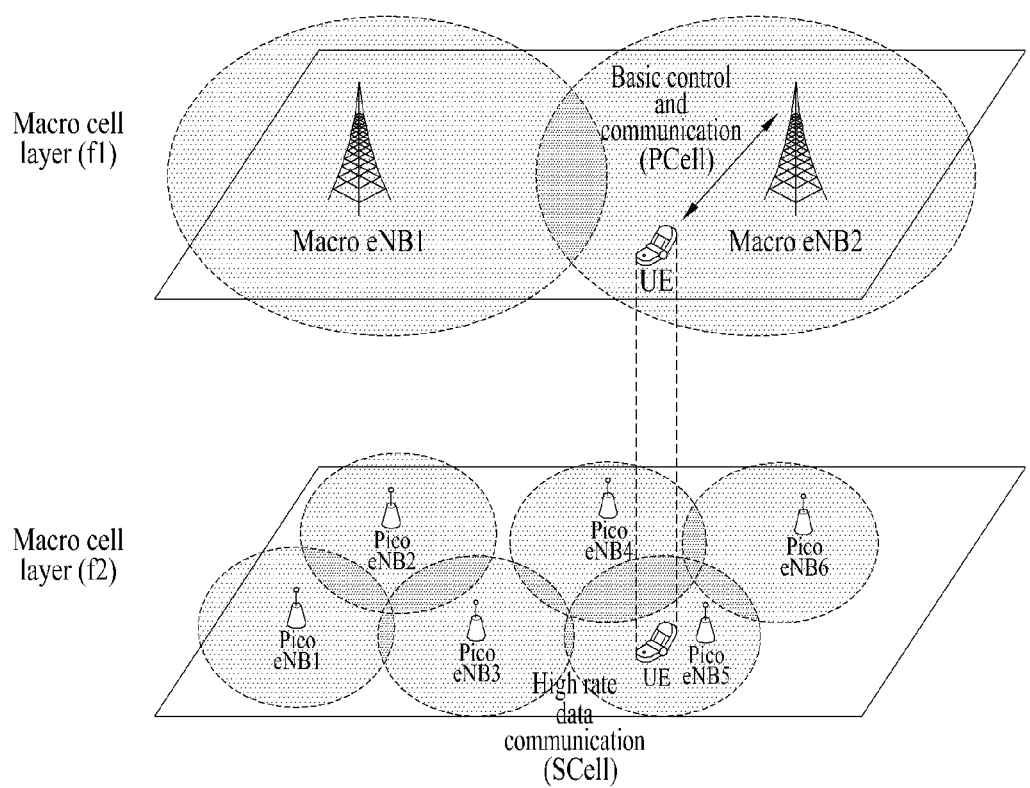
FIG. 8 illustrates a configuration of a network using two component carriers.

FIG. 8 illustrates a configuration of a network using two component carriers.

Referring to FIG. 8, a macro cell layer is composed of a small number of macro cells having wide coverage using one carrier frequency $f_1$. The carrier frequency $f_1$ is included in a relatively low frequency band having less propagation attenuation to provide fundamental communication services of UEs and used for operation such as mobility management. Accordingly, the carrier frequency is preferably set to a PCell.

In addition, a micro cell layer is composed of a large number of micro cells having smaller coverage using another carrier frequency $f_2$. The carrier frequency $f_2$ is included in a relatively high frequency band such that the carrier frequency $f_2$ easily occupies a wide bandwidth even in case of large propagation attenuation and provides high-quality communication services for a specific region. Accordingly, the carrier frequency $f_2$ is preferably set to an SCell.

In a situation as shown in FIG. 8, a UE is easily configured to perform communication with eNBs in all cell layers in the case of downlink communication because a plurality of receivers is easily implemented and power consumed to operate the receivers is not considerably high. In uplink communication, however, it may be difficult for the UE to communicate with eNBs in all cell layers because mutual interference between transmitters needs to be solved and transmission power consumed by a plurality of transmitters operating in different frequency bands increases when the plurality of transmitters is simultaneously operated.

Accordingly, to obtain high data throughput, particularly, a high data throughput on downlink while reducing UE implementation costs, a UE is configured to simultaneously receive downlink signals in a plurality of cell layers and to transmit an uplink signal only in part of the cell layers (e.g. only one layer) at a given point in time.

The present invention provides a method for appropriately managing uplink resources when the number of cell layers in which a UE can simultaneously transmit/receive signals on downlink is different from the number of cell layers in which the UE can simultaneously transmit/receive signals on uplink. For convenience of description, it is assumed that the UE can simultaneously receive signals in two cell layers $f_{1,D}$ and $f_{2,D}$ (or two frequency bands) in the case of downlink, whereas the UE can transmit signals only in one of two cell layers $f_{1,U}$ and $f_{2,U}$ at a point in time on uplink. In a TDD system that discriminates uplink from downlink according to time in the same frequency band, $f_{1,D}$ equals $f_{1,U}$.

Under this assumption, the UE needs to appropriately select a layer in which uplink communication will be performed whenever the UE performs uplink communication since the UE can perform communication only in one layer through uplink resources. Assume that communication with respect to fundamental control signals is performed by setting the macro cell layer to a PCell and communication with respect to large-capacity data is performed by setting the micro cell layer to an SCell, as shown in FIG. 8, uplink is preferably set to the macro cell layer since most of related downlink signals are transmitted from the PCell when the UE initially attempts network access. If the network recognizes surrounding information of the UE and discovers an appropriate neighboring micro eNB on the basis of the surrounding information, then most downlink signals are transmitted from the SCell and it is desirable that uplink operation be performed in the micro cell layer in which resource reuse is easy and communication can be performed with low power. When the UE moves to a region in which a neighboring micro eNB is not present, it is appropriate to set uplink operation to the micro cell layer for minimal communication.

The aforementioned operations are characterized in that a cell set to the PCell once in the macro cell layer is maintained if communication is performed within the downlink region of the cell in the case of downlink operation while the cell layer in which uplink operation is performed can be varied according to situation. That is, there is a need for an operation of changing a cell layer in which uplink operation is performed while maintaining a downlink PCell.

To provide the operation, the present invention proposes an operation of a UE to change a cell layer in which uplink operation is performed while maintaining a downlink PCell according to instructions of a network. A description will be given of detailed embodiments of signaling for performing the operation.

The network can change a cell layer with respect to uplink operation by transmitting a special handover command or an RRC connection reconfiguration message having a function of reconfiguring an associated cell to the UE. According to the special handover command, a cell layer in which uplink transmission will be performed becomes different from a previous cell layer while a handover target cell is maintained as a current serving cell in the case of downlink transmission. Accordingly, the cell ID of the target cell can be omitted in the handover command. The handover command can include information on a cell layer in which the UE will perform uplink transmission, for example, a frequency band and scrambling sequence related parameters to be used for generation of an uplink signal.

In particular, the cell layer in which the UE will perform uplink transmission may differ from an uplink cell layer linked to the handover target cell (which is identical to the serving cell in downlink transmission) through system information.

Upon reception of the handover command, the UE performs handover operation in the designated cell layer and carries out uplink transmission through the designated cell layer.

Figure 9:
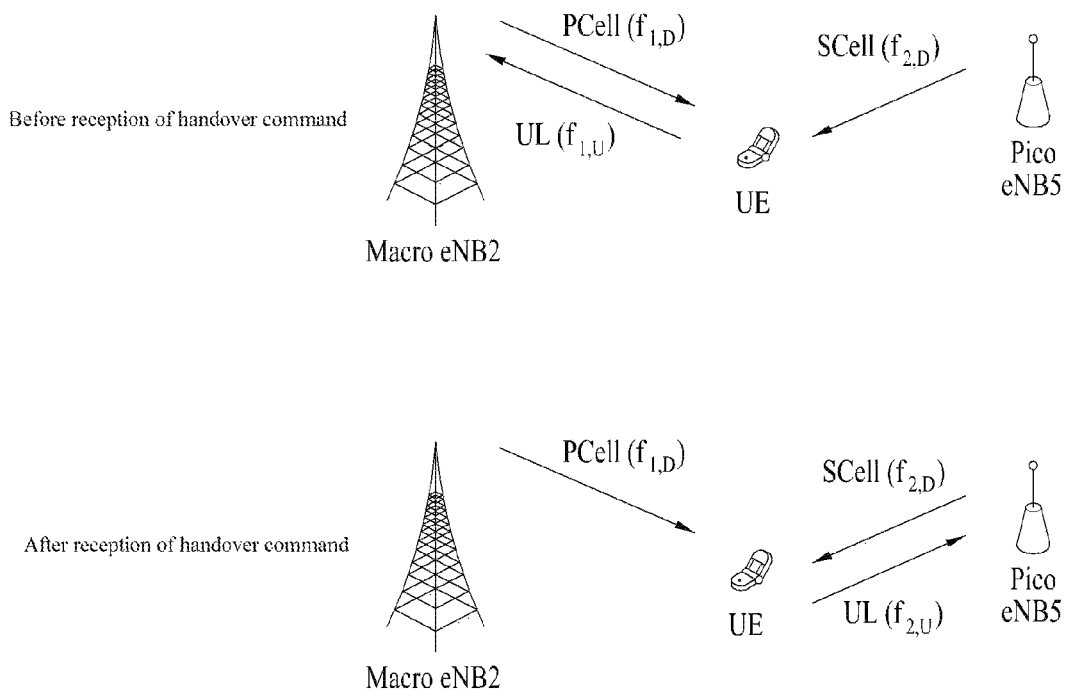
FIG. 9 is a diagram illustrating a handover operation according to an embodiment of the present invention.

FIG. 9 illustrates a handover operation according to an embodiment of the present invention.

Referring to FIG. 9, a UE respectively sets a macro cell layer and a pico cell layer to a PCell and an SCell for downlink operation and, simultaneously, performs uplink operation in a macro cell layer used for initial access while being initially connected to a macro eNB2.

When the UE receives the handover command according to the present invention, the UE moves only the uplink operation to the pico cell layer while maintaining a downlink serving cell configuration, particularly, maintaining the cell ID of the PCell from the viewpoint of downlink. This procedure is compared with a conventional uplink carrier aggregation operation.

In the conventional carrier aggregation operation, the UE constructs two uplink transmission circuits, respectively allocates the uplink transmission circuits to a macro cell layer and a pico cell layer and transmits signals only through the macro cell layer, only through the pico cell layer or through both cells in each subframe according to uplink scheduling of an eNB. For example, the eNB can predefine the ID of a cell layer through which uplink transmission will be transmitted, and an uplink grant can indicate the cell layer in which uplink transmission will be performed according to corresponding scheduling information.

According to the present invention, the UE constructs only one uplink transmission circuit and simultaneous transmission through two cells in one subframe is impossible. Although a signal is transmitted through only one cell layer in one subframe, it may be impossible to dynamically change the cell layer per subframe because the transmission circuit needs to be prepared for operation of a frequency region for a predetermined time in order to transmit a signal through the frequency region.

Accordingly, in the operation according to the present invention, when the cell layer in which the UE will perform uplink transmission is designated according to instruction of the eNB, uplink transmission can be continuously performed only in the cell layer for a predetermined time. Consequently, the transmission cell layer is not changed per subframe, distinguished from the conventional carrier aggregation operation, and thus it is unnecessary to indicate the transmission cell layer using an uplink grant.

In addition, since uplink transmission of the UE is performed only in the cell layer connected to the SCell, as shown in FIG. 9, uplink transmission cannot be performed in the cell layer connected to the PCell at least for a predetermined time and thus the eNB needs to perform appropriate operation considering this state. For example, when the uplink transmission cell layer is changed to the cell layer connected to the SCell, the eNB can automatically cancel periodic channel status information (CSI) reporting, transmission of a sounding reference signal (SRS), semi-persistent scheduling (SPS) based transmission, which have been performed through the cell layer connected to the PCell.

Alternatively, the network may change a cell layer for uplink operation by transmitting a special PDCCH order to the UE. The PDCCH order is a downlink control information (DCI) message having a special field. Upon reception of the PDCCH order, the UE performs a random access procedure according to a predetermined rule. The present invention provides a method of adding the special field to a conventional PDCCH order to enable the network to control an uplink cell layer in which a random access operation according to the PDCCH order will be performed. In a different sense, cross carrier scheduling for the PDCCH order is performed. To this end, the field in the PDCCH order designates the cell layer in which random access according to the PDCCH order will be performed.

Upon reception of the PDCCH order, the UE performs the random access procedure in the cell layer designated by the PDCCH order and continuously performs uplink transmission through the designated cell layer. When the random access procedure initiated by the PDCCH order is performed, previous downlink operation is maintained. Even in this case, uplink transmission in the cell layer connected to the PCell is limited, as described above, and thus the eNB needs to perform appropriate operation considering the limited uplink transmission. For example, when the uplink transmission cell layer is changed to the cell layer connected to the SCell, the eNB can automatically cancel transmission of a periodic CSI report, SRS, SPS information and the like, which have been transmitted through the cell layer connected to the PCell.

Alternatively, the network may change the cell layer for uplink operation using a component carrier activation message transmitted through a MAC control element (CE). The component carrier activation message is currently composed of a bitmap. In the component carrier activation message, bits of the bitmap respectively indicate component carriers and a component carrier corresponding to a bit set to 1 is defined as being activated. Here, component carriers that are the object of a component carrier activation message are defined on the basis of downlink component carriers. Accordingly, when a specific component carrier is activated on downlink, an uplink component carrier, which is associated with the specific component carrier through system information, is also activated. If the UE cannot perform uplink transmission for a plurality of cell layers, then activation of uplink for SCells may be meaningless.

According to the present invention, combinations of downlink cell IDs (or cell layers) and uplink cell IDs (or cell layers) are defined and allocated to bits of the bitmap of the component carrier activation message and a combination desired by the network is activated.

FIG. 10 illustrates structures of the component carrier activation message according to embodiments of the present invention.

Referring to FIGS. 8 and 10(a), the network assigns a combination, which corresponds to communication with macro eNB2 on both downlink and uplink, to the first bit of the component carrier activation/deactivation message and assigns a combination, which corresponds to downlink communication with macro eNB2 and uplink communication with pico eNB5, to the second bit through higher layer signaling such as RRC signaling, and then selects one of the first bit and the second bit, which corresponds to a desired combination. Accordingly, it is possible to change the uplink operation cell layer while maintaining the downlink serving cell.

When the aforementioned signaling is used, if cell layers that can be simultaneously used for the UE to transmit signals are limited to one cell layer, a specific bit may be assigned to a combination of a downlink operation cell layer and an uplink operation cell layer and thus downlink operation of the UE may be limited such that the downlink operation is always performed in the PCell. This means that the activated downlink cell is automatically set to the PCell when the corresponding bit is 1, and thus the corresponding bit can be used as the identifier of a cell layer in which uplink operation is performed without additional signaling. That is, b0 and b1 in FIG. 10(a) indicate whether the activated cell is macro eNB2 or pico eNB5 on uplink. Other states that do not correspond to combinations with uplink operation can be regarded as indicating activation on downlink only.

Referring to FIGS. 8 and 10(b), macro eNB2 corresponding to the PCell can be assumed or defined as being always activated on downlink and a combination of downlink of a specific SCell and uplink of a specific cell layer, which may differ from the specific SCell, can be allocated to the bitmap of the component carrier activation message. In FIG. 10(b), a combination of pico eNB5 activated on downlink and macro eNB2 activated on uplink is assigned to the first bit and a state indicating that pico eNB5 is activated on both uplink and downlink to the second bit. Of course, macro eNB2 which is the PCell is always activated on downlink without additional signaling.

In addition, when an activated cell layer is changed while the downlink serving cell is maintained, the UE can continuously receive a downlink signal of the maintained serving cell and thus it is not necessary to impose restrictions on CSI or measurement such as RRM (Radio Resource Management). Furthermore, since uplink synchronization needs to be newly set when the uplink operation cell layer is changed, the UE can automatically perform random access in a newly activated cell layer within a predetermined time. In this case, a random access preamble to be used may be signaled by the eNB through system information or RRC signaling. In particular, the preamble used for the random access procedure can be set such that contention-based random access preambles used for initial access are excluded. This means that the UE selects one of preambles other than the contention-based random access preambles and uses the selected preamble if the preamble used for the random access procedure is not designated.

Since the number of uplink cell layers that can be simultaneously activated by the UE is limited in the example of FIG. 10, specific bits cannot be simultaneously set to 1. For example, when b0 and b1 are simultaneously set to 1 in FIG. 10(a), the UE needs to perform uplink operation in both the macro cell layer and the pico cell layer but the UE is not able to perform such operation. Accordingly, the corresponding combination must not be set by the eNB and the UE needs to notify the eNB of the number of cell layers through which the UE can simultaneously perform uplink operation.

In addition, when the UE attempts random access in a cell layer different from the currently operated cell layer, random access may fail due to unexpected handover of the UE, interference and the like. In this case, if the UE continuously attempts to perform uplink transmission, even a fundamental control signal may not be transmitted. To solve this problem, a specific timer may be predefined and, when random access is not successfully performed in a cell layer which is changed within a timer operating time, the UE may return to the previous uplink cell layer or an uplink cell layer connected to the PCell and perform uplink operation therein. In this case, the UE can operate to newly set uplink synchronization by performing random access without an additional instruction.

Alternatively, when the UE is instructed by the network to change a new cell layer to another cell layer for uplink operation even if the UE is performing random access in the new cell layer, the UE may terminate the random access procedure through a method for reporting termination of random access to a higher layer, for example, and perform random access in a changed cell layer. Methods for announcing termination of random access include a method for announcing termination even before random access is successfully ended and a method for announcing random access failure during random access.

The aforementioned operation of changing an uplink operation cell layer may be performed by the UE without an instruction of the network. In particular, this autonomous cell layer change operation may be useful when the UE moves and thus communication through the previous uplink cell layer cannot be performed but the network cannot recognize this state. For example, when a PDSCH is continuously retransmitted more than a predetermined number of times though the UE has successfully received the PDSCH and transmitted ACK, the UE can consider that the uplink ACK is not successfully received and change the uplink operation cell layer. In this case, particularly, it is advantageous that the uplink operation cell layer is changed from the pico cell layer set to the SCell to the macro cell layer set to the PCell such that an uplink signal arrives at the network more stably in a wide area.

Figure 11:
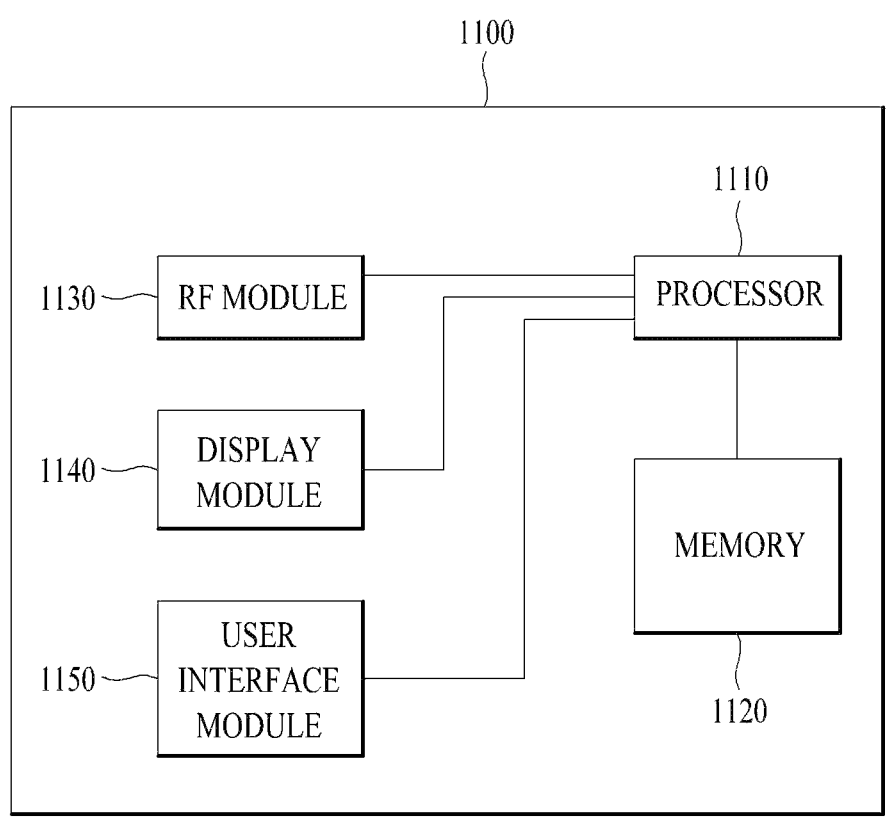
FIG. 11 is a block diagram of a communication apparatus according to one embodiment of the present invention.

FIG. 11 is a block diagram of a communication apparatus according to one embodiment of the present invention.

Referring to FIG. 11, a communication apparatus 1100 includes a processor 1110, a memory 1120, a Radio Frequency (RF) module 1130, a display module 1140 and a user interface module 1150.

The communication apparatus 1100 is shown for convenience of description and some modules thereof may be omitted. In addition, the communication apparatus 1100 may further include necessary modules. In addition, some modules of the communication apparatus 1100 may be subdivided. The processor 1110 is configured to perform an operation of the embodiment of the present invention described with reference to the drawings. For a detailed description of the operation of the processor 1110, reference may be made to the description associated with FIGS. 1 to 10.

The memory 1120 is connected to the processor 1110 so as to store an operating system, an application, program code, data and the like. The RF module 1130 is connected to the processor 1110 so as to perform a function for converting a baseband signal into a radio signal or converting a radio signal into a baseband signal. The RF module 1130 performs analog conversion, amplification, filtering and frequency up-conversion or inverse processes thereof. The display module 1140 is connected to the processor 1110 so as to display a variety of information. As the display module 1140, although not limited thereto, a well-known device such as a Liquid Crystal Display (LCD), a Light Emitting Diode (LED), or an Organic Light Emitting Diode (OLED) may be used. The user interface module 1150 is connected to the processor 1110 and may be configured by a combination of well-known user interfaces such as a keypad and a touch screen.

The above-described embodiments are proposed by combining constituent components and characteristics of the present invention according to a predetermined format. The individual constituent components or characteristics should be considered to be optional factors on the condition that there is no additional remark. If required, the individual constituent components or characteristics may not be combined with other components or characteristics. In addition, some constituent components and/or characteristics may be combined to implement the embodiments of the present invention. The order of operations to be disclosed in the embodiments of the present invention may be changed. Some components or characteristics of any embodiment may also be included in other embodiments, or may be replaced with those of the other embodiments as necessary. Moreover, it will be apparent that some claims referring to specific claims may be combined with other claims referring to the other claims other than the specific claims to constitute the embodiment or add new claims by means of amendment after the application is filed.

A specific operation described as performed by the BS may be performed by an upper node of the BS. Namely, it is apparent that, in a network comprised of a plurality of network nodes including a BS, various operations performed for communication with a UE may be performed by the BS, or network nodes other than the BS. The term "BS" may be replaced with the term "fixed station", "Node B", "eNode B (eNB)", "access point", etc.

The embodiments of the present invention can be implemented by a variety of means, for example, hardware, firmware, software, or a combination thereof. In the case of implementing the present invention by hardware, the present invention can be implemented through application specific integrated circuits (ASICs), digital signal processors (DSPs), digital signal processing devices (DSPDs), programmable logic devices (PLDs), field programmable gate arrays (FPGAs), a processor, a controller, a microcontroller, a microprocessor, etc.

If operations or functions of the present invention are implemented by firmware or software, the present invention can be implemented in the form of a variety of formats, for example, modules, procedures, functions, etc. The software code may be stored in a memory unit so as to be driven by a processor. The memory unit may be located inside or outside of the processor, so that it can communicate with the aforementioned processor via a variety of well-known parts.

It will be apparent to those skilled in the art that various modifications and variations can be made in the present invention without departing from the spirit or scope of the invention. Thus, it is intended that the present invention cover the modifications and variations of this invention provided they come within the scope of the appended claims and their equivalents.

INDUSTRIAL APPLICABILITY

While the method and device for transmitting and receiving a signal by a terminal in a wireless communication system to which carrier aggregation is applied according to the present invention are applied to 3GPP LTE in the above description, the present invention is applicable to various wireless communication systems other than 3GPP LTE.

The invention claimed is:

1. A method for transmitting and receiving a signal by a terminal over a network in a wireless communication system, the method comprising:
receiving a downlink signal from the network through a downlink cell and transmitting an uplink signal to the network through a first uplink cell;
receiving a specific message for changing the first uplink cell to a second uplink cell from the network;
changing the first uplink cell to the second uplink cell according to the specific message and transmitting the uplink signal to the network through the second uplink cell;
performing a random access procedure with the second uplink cell during an operation time of a timer when the first uplink cell is changed to the second uplink cell; and
re-changing the second uplink cell to the first uplink cell when the random access procedure is not terminated before the timer expires,
wherein when the first uplink cell is changed to the second uplink cell, the downlink cell is maintained.

2. The method according to claim 1, wherein the specific message is one of a handover command message, a radio resource control (RRC) connection reconfiguration message, a physical downlink control channel (PDCCH) order and a component carrier activation message.

3. The method according to claim 1, wherein transmission of a channel state report, transmission of a sounding reference signal and semi-persistent scheduling based transmission, performed through the first uplink cell, are canceled when the first uplink cell is changed to the second uplink cell.

4. The method according to claim 1, wherein the specific message includes information about the second uplink cell.

5. The method according to claim 1, further comprising:
transmitting a random access preamble to the network through the second uplink cell when the first uplink cell is chanced to the second uplink cell,
wherein the random access preamble is pre-received through system information or an RRC layer message.

6. The method according to claim 5, wherein preambles for contention-based random access are excluded from the random access preamble.

7. A terminal in a wireless communication system, comprising:
an RF communication module for receiving a downlink signal from a network through a downlink cell and transmitting an uplink signal to the network through a first uplink cell; and
a processor for processing the downlink signal and the uplink signal,
wherein the processor is configured to:
change the first uplink cell to a second uplink cell according to a specific message when a specific message for changing the first uplink cell to the second uplink cell is received from the network and to control the RF communication unit to transmit the uplink signal to the network through the second uplink cell,
perform a random access procedure with the second uplink cell during an operation time of a timer when the first uplink cell is changed to the second uplink cell, and
re-change the second uplink cell to the first uplink cell when the random access procedure is not terminated before the timer expires,
wherein when the first uplink cell is changed to the second uplink cell, the downlink cell is maintained.

8. The terminal according to claim 7, wherein the specific message is one of a handover command message, an RRC connection reconfiguration message, a PDCCH order and a component carrier activation message.

9. The terminal according to claim 7, wherein the processor is configured to cancel channel state reporting, transmission of a sounding reference signal and semi-persistent scheduling based transmission, performed through the first uplink cell, when the first uplink cell is changed to the second uplink cell.

10. The terminal according to claim 7, wherein the specific message includes information about the second uplink cell.

11. The terminal according to claim 7, wherein the processor controls the RF communication module to transmit a random access preamble to the network through the second uplink cell when the first uplink cell is changed to the second uplink cell, and
wherein the random access preamble is pre-received through system information or an RRC layer message.

12. The ten final according to claim 11, wherein preambles for contention-based random access are excluded from the random access preamble.

* * * * *